United States Patent
Stone

(10) Patent No.: US 10,906,611 B1
(45) Date of Patent: Feb. 2, 2021

(54) MOTORCYCLE ENGINE MOUNT AND METHOD OF USE

(71) Applicant: Timothy Ross Stone, Santa Clarita, CA (US)

(72) Inventor: Timothy Ross Stone, Santa Clarita, CA (US)

(*) Notice: Subject to any disclaimer, the term of this patent is extended or adjusted under 35 U.S.C. 154(b) by 0 days.

(21) Appl. No.: 16/372,969

(22) Filed: Apr. 2, 2019

(51) Int. Cl.
*B62M 7/02* (2006.01)
*B62K 11/04* (2006.01)
*F16F 15/06* (2006.01)
*F16F 15/08* (2006.01)

(52) U.S. Cl.
CPC .............. *B62M 7/02* (2013.01); *B62K 11/04* (2013.01); *F16F 15/06* (2013.01); *F16F 15/08* (2013.01); *F16F 2224/025* (2013.01)

(58) Field of Classification Search
CPC .. B62M 7/02; F16F 15/08; F16F 15/06; F16F 2224/025; B62K 11/04
USPC ........ 248/560, 562, 566, 568, 571, 609, 634
See application file for complete search history.

(56) References Cited

U.S. PATENT DOCUMENTS

| | | | |
|---|---|---|---|
| 4,223,762 A * | 9/1980 | Gertal | F16C 27/06 188/268 |
| 5,390,758 A * | 2/1995 | Hunter | B60K 5/1208 180/227 |
| 7,503,552 B2 * | 3/2009 | Huprikar | F16F 1/37 267/140.13 |
| 10,578,188 B2 * | 3/2020 | Kojima | F16F 13/1463 |
| 2002/0066611 A1 * | 6/2002 | Lane | B62K 11/04 180/228 |
| 2011/0095163 A1 * | 4/2011 | Phan | F16C 27/04 248/562 |
| 2016/0138673 A1 * | 5/2016 | Hattori | B62D 33/0604 248/634 |
| 2018/0162212 A1 * | 6/2018 | Kim | F16F 13/107 |
| 2019/0003552 A1 * | 1/2019 | Iraki | F16F 1/3863 |
| 2019/0017264 A1 * | 1/2019 | Kochiyama | E04B 1/98 |

* cited by examiner

*Primary Examiner* — Muhammad Ijaz
(74) *Attorney, Agent, or Firm* — Richard Eldredge; Eldredge Law Firm

(57) ABSTRACT

A motorcycle engine mount includes a frame plate to fit into a frame of the motorcycle; a power train unit plate to connect to an engine assembly of the motorcycle; an elastomer element secured between the frame plate and the power train unit plate; and a thrust block element secured between the frame plate and the power train unit plate; the elastomer element allows for vertical and longitudinal movement of the power train unit relative to the frame; and the thrust block element inhibits compression of the elastomer element from lateral forces.

4 Claims, 6 Drawing Sheets

MOTORCYCLE ENGINE MOUNT AND METHOD OF USE

BACKGROUND

1. Field of the Invention

The present invention relates generally to stabilizing mounts for motorcycles, and more specifically, to a mount with an elastomer element and a thrust blocking element for improved stability while reducing lateral compression of the mount.

2. Description of Related Art

Motorcycles are well known in the art and are an effective means of recreation and transportation. It is well known that some motorcycles produce a lot of vibration from the power train unit which is transmitted to the frame of the motorcycle. This vibration is commonly felt by the rider and can be uncomfortable and result in a poor riding experience. In order to combat this vibration, it is common for motorcycle manufacturers to use one or more elastomer mounts as a soft connection between the power train unit and the motorcycle frame.

In FIG. 1, a simplified diagram 101 of a motorcycle from a rear perspective is shown. As shown, the diagram includes a frame 107, a wheel 103, a top engine link 109, a bottom front engine link 102, and conventional rubber mounts 104, 105. The rubber mounts are used to absorb some of the vibration to make the rider more comfortable and the one or more links are used to stabilize the motorcycle in an attempt to prevent lateral compression.

As shown, the current system is ineffective. As a rider engages in a turn of the motorcycle, it causes lateral force, as shown with arrows A and B. This lateral force will cause the rubber mounts to compress under lateral stress loads and can result in instability of the motorcycle. The stabilizer links aid in keeping the motorcycle stable but require another element to be added to the motorcycle.

Accordingly, the conventional method of reducing vibration while ensuring a stable ride requires multiple elements and is still not an effective solution. It is an object of the present invention to provide a non-compressible mount that does not require additional link stabilizers to be added to the motorcycle.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
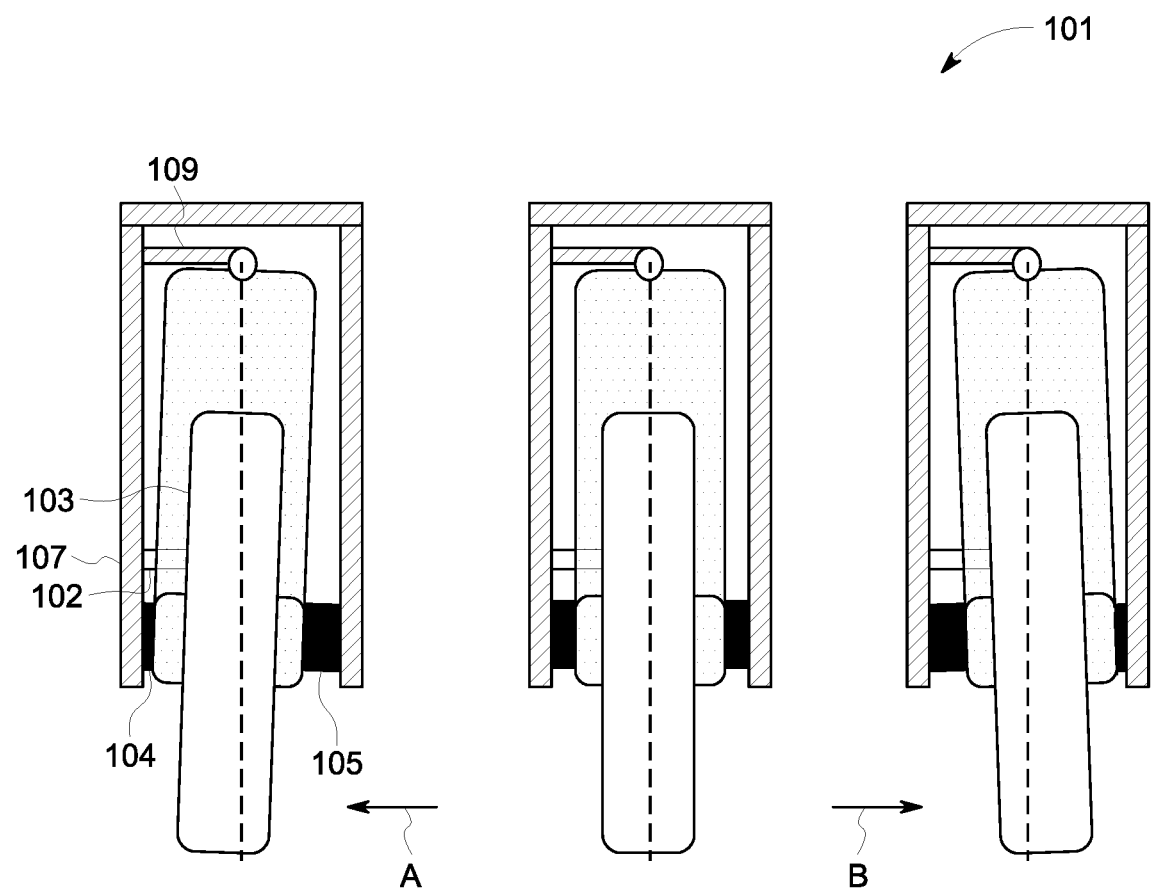
FIG. 1 is a simplified diagram of a conventional motorcycle system with one or more rubber mounts and one or more link stabilizers.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional rubber mounts. Specifically, the present invention utilizes an elastomer element and a thrust blocking element, thereby allowing for vertical and longitudinal movement of the power train unit relative to the frame while inhibiting compression of the elastomer element from lateral forces. This feature provides for vibration dampening and lateral stabilization in a single device. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
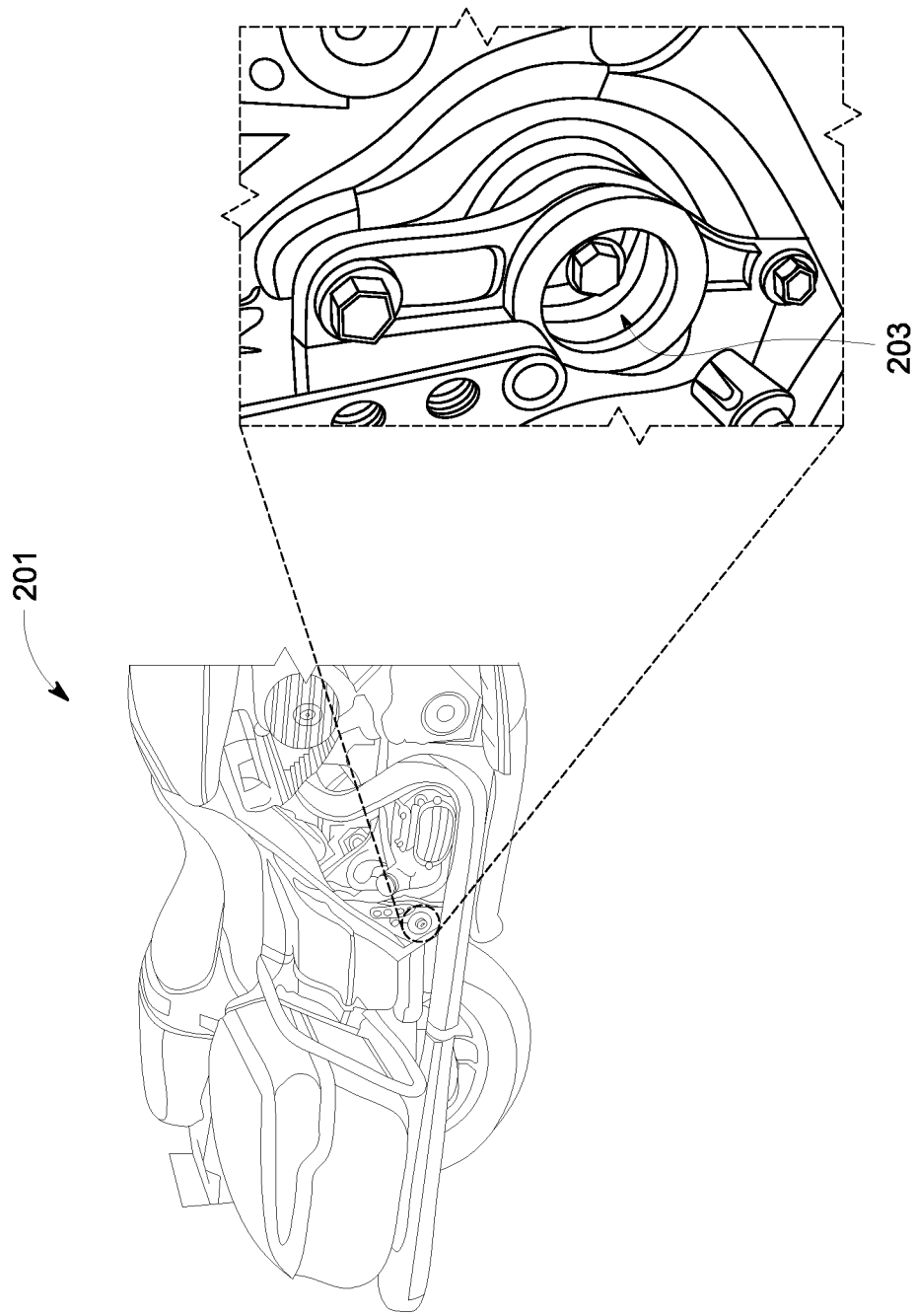
FIG. 2 is a side view of an axial mounted non-compression mount in accordance with a preferred embodiment of the present application.

Referring now to the drawings wherein like reference characters identify corresponding or similar elements throughout the several views, FIG. 2 depicts a partial side view of a motorcycle 201 with an axial mounted non-compression mount 203 in accordance with a preferred embodiment of the present application. It will be appreciated that mount 203 overcomes one or more of the above-listed problems commonly associated with conventional un-stabilized elastomer type mounts commonly used with motorcycles. It should be appreciated that the mount can be used in a variety of machinery that could require external stabilizers.

Figure 3:
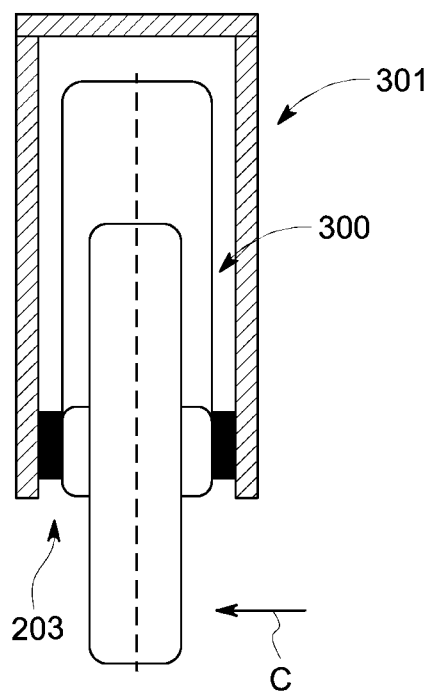
FIG. 3 is a rear view diagram of a motorcycle with the mount of FIG. 2 incorporated therein.

In FIG. 3, a diagram depicts the inclusion of mount 203 with a motorcycle. As shown, the application of a lateral force (C) does not cause unwanted shifting or side to side movement of the power train unit 300 within the frame 301 of the motorcycle, even without the addition of stabilizing links or other components.

Figure 4:
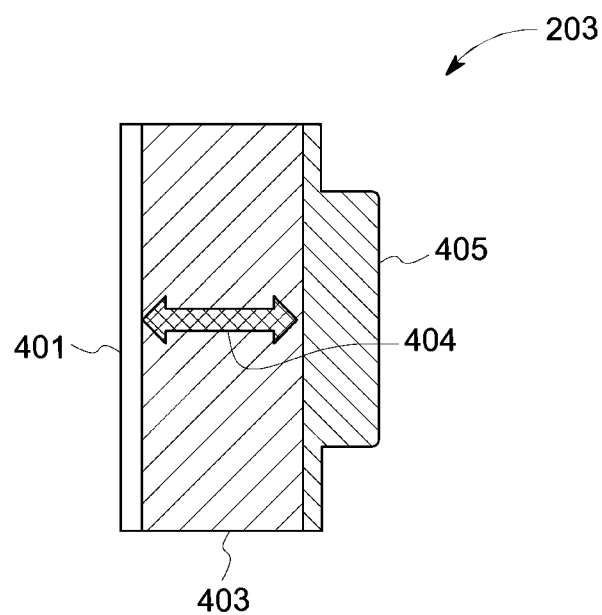
FIG. 4 is a simplified cross-sectional view of a non-compression mount in accordance with the present application.

In the contemplated embodiment, shown in FIG. 4 in a simplistic form, apparatus 203 includes a frame plate 405 configured to secure to a motorcycle frame, a power train unit (PTU) plate 401 configured to secure to the power train unit of the motorcycle, an elastomer element 403 secured between the frame plate 405 and the PTU plate 401, and a thrust blocking element 404 also secured between the frame plate 405 and the PTU plate 401.

It should be appreciated that one of the unique features believed characteristic of the present application is the inclusion of an elastomer element and a thrust blocking element. The elastomer element, being secured between the two plates, is configured to allow for vertical and longitudinal movement, thereby reducing vibrations for the rider. The thrust blocking element inhibits at least some amount of compression of the elastomer element, thereby blocking unwanted lateral movement of the PTU within the frame and keeping the motorcycle stabilized.

It should be appreciated that the exact configuration of the components can vary. For example, the elastomer element 403 could be composed of a rubber, a polyurethane, or any similar substance designed to absorb kinetic vibration energy. Similarly, the thrust blocking component 404 can be any of a number of elements, such as a friction interface, one or more roller bearings, one or more wobble legs, or the like.

Figure 5:
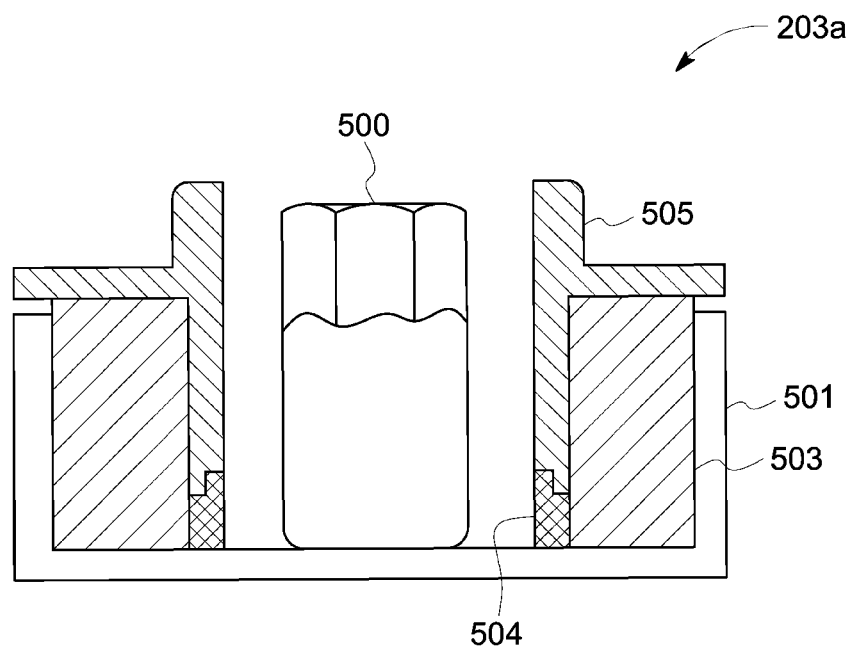
FIG. 5 is a cross sectional view of a first embodiment of a mount in accordance with the present application.
Figure 6:
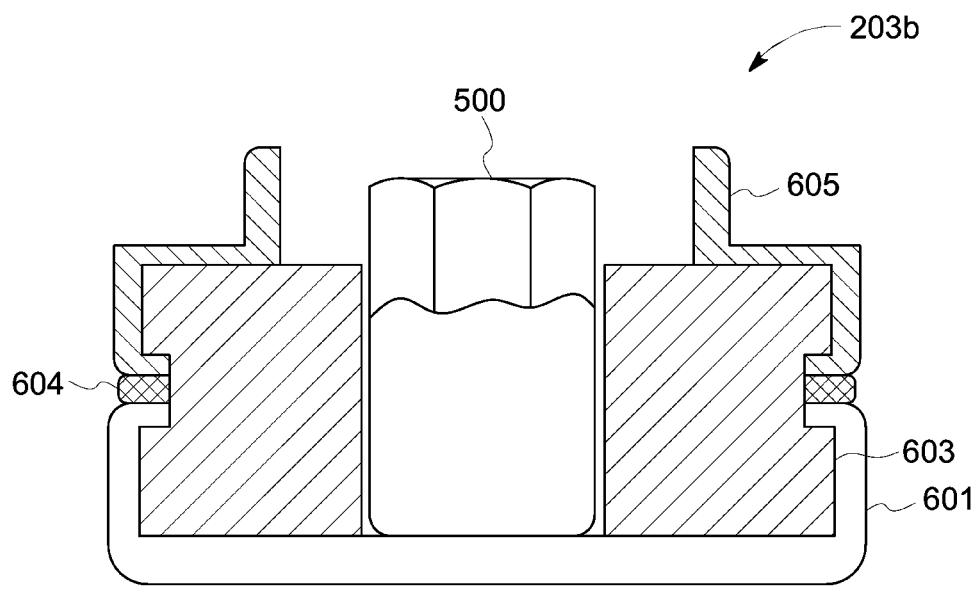
FIG. 6 is a cross sectional view of a second embodiment of a mount in accordance with the present application.
Figure 7:
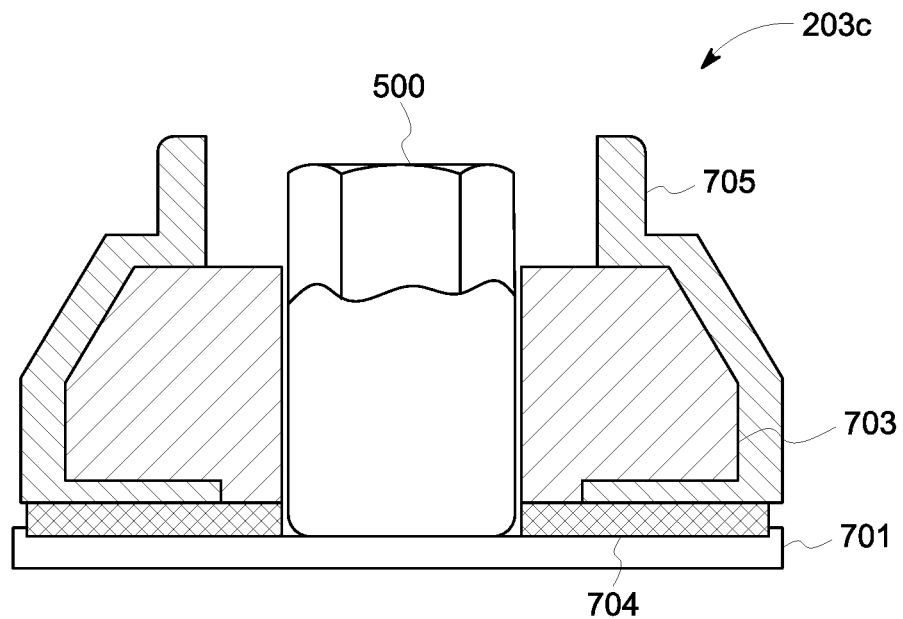
FIG. 7 is a cross sectional view of a third embodiment of a mount in accordance with the present application.

In FIG. 5 a first embodiment 203a is shown with mounting device 500. This embodiment shows a frame plate 505, a PTU plate 501, an elastomer element 503, and a friction interface 504 acting as the thrust blocking element. Similarly, FIG. 6, depicts an embodiment 203b having a frame plate 605, PTU plate 601, elastomer element 603, and friction interface 604 acting as the thrust blocking component. In FIG. 7, yet another alternative embodiment 203c is shown, having frame plate 705, PTU plate 701, elastomer element 703, and a friction interface 704 acting as a thrust blocking component.

Figure 8:
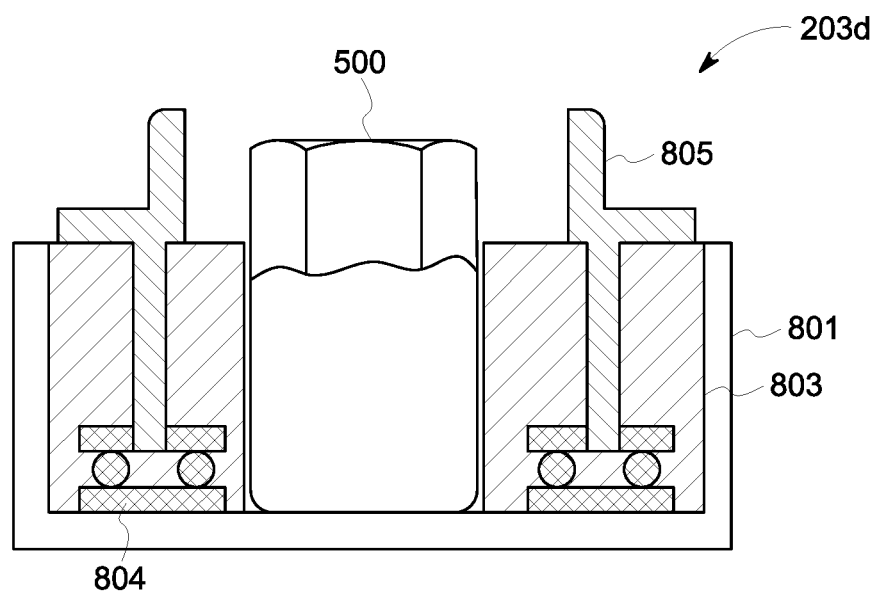
FIG. 8 is a cross sectional view of a fourth embodiment of a mount in accordance with the present application.

In FIG. 8, an alternative embodiment 203d depicts the use of ball bearings 804 as the thrust blocking component, the embodiment 203d further including a frame plate 805, PTU plate 801, and elastomer element 803.

Figure 9:
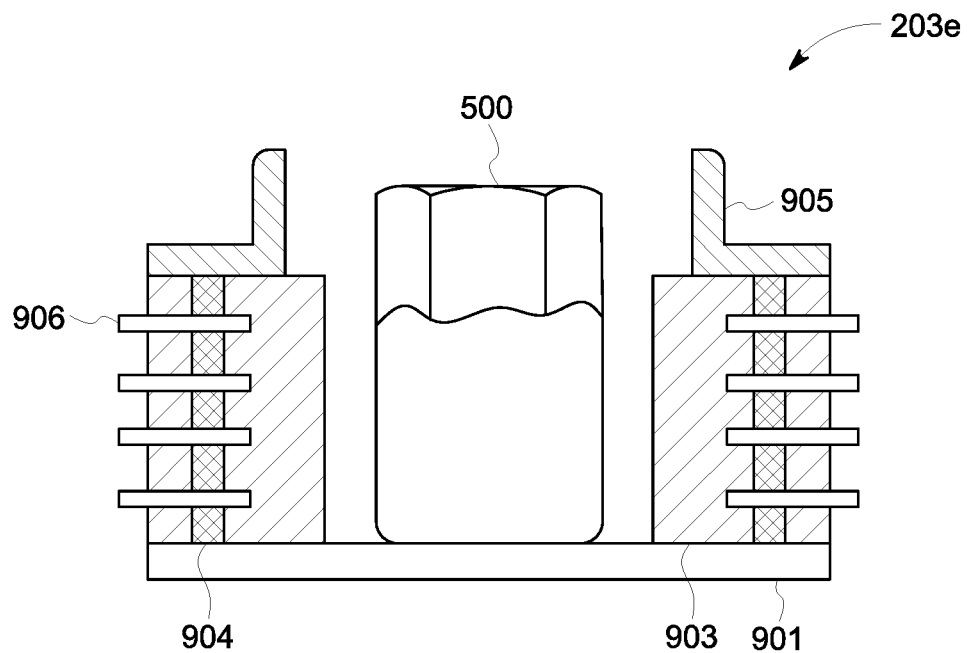
FIG. 9 is a cross sectional view of a fifth embodiment of a mount in accordance with the present application.

In FIG. 9, another alternative embodiment 203e is shown, wherein the embodiment includes a fused rubber elastomer mount 906 having thrust blocking elements 904 contained therein. This embodiment further including the frame plate 905, PTU plate 901, and elastomer element 903.

Figure 10:
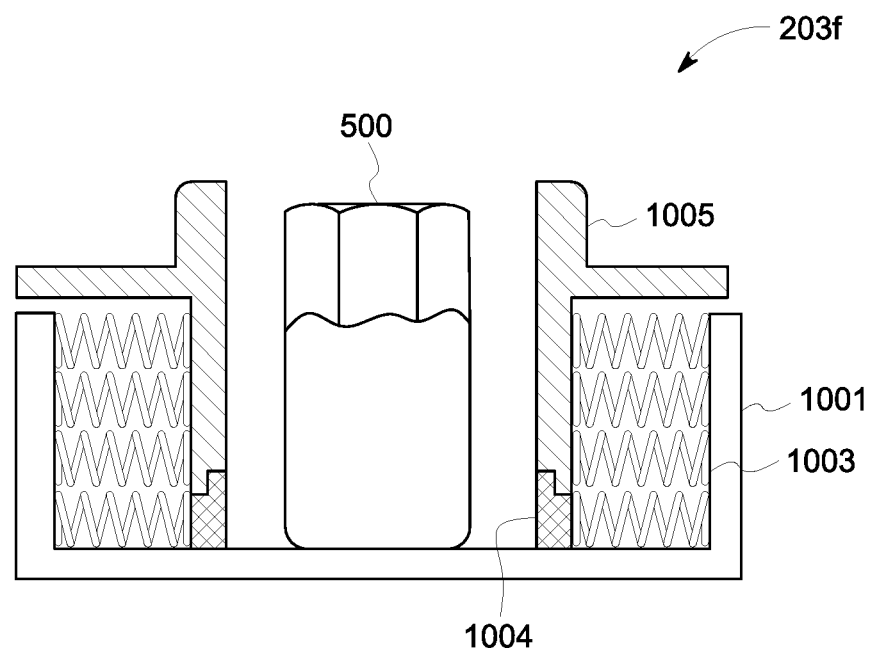
FIG. 10 is a cross sectional view of a sixth embodiment of a mount in accordance with the present application.

In FIG. 10, an embodiment 203f is shown. This embodiment shows a frame plate 1005, a PTU plate 1001, the use of springs as an elastomer element 1003, and a friction interface 1004 acting as the thrust blocking element.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A motorcycle engine mount, comprising:
   a frame plate configured to engage with a frame of a motorcycle;
   a power train unit plate configured to connect to an engine assembly of the motorcycle;
   an elastomer mount, having:
      a body forming a cavity;
      an elastomeric element disposed within the cavity and secured to both the frame plate and the power train unit plate;
      a plurality of ball bearings disposed within the elastomeric element; and
      a mounting device disposed within the cavity and secured to the power train unit;
   a thrust block element secured between the frame plate and the power train unit plate;
   wherein the elastomer element allows for at least a longitudinal movement of the power train unit relative to the frame; and
   wherein the thrust block element inhibits compression of the elastomer element from lateral forces.

2. The mount of claim 1, wherein the elastomer element is composed of a rubber.

3. The mount of claim 1, wherein the elastomer element is composed of a polymer.

4. The mount of claim 1, wherein the mount is configured to be axial mounted to the motorcycle.

* * * * *